Dec. 17, 1929.  C. B. USTONSON  1,739,743
METHOD OF MAKING BIFOCAL LENSES
Filed March 21, 1928
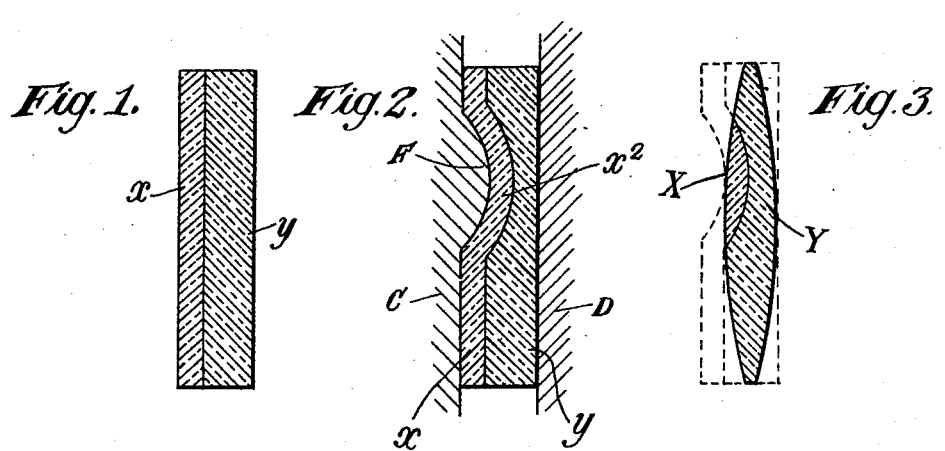
INVENTOR
Cyril. B. Ustonson.
Per. Raynes &c.
Attorneys.

Patented Dec. 17, 1929

1,739,743

UNITED STATES PATENT OFFICE

CYRIL BERTIE USTONSON, OF CLERKENWELL, LONDON, ENGLAND

METHOD OF MAKING BIFOCAL LENSES

Application filed March 21, 1928, Serial No. 263,556, and in Great Britain March 31, 1927.

This invention relates to lenses of the kind known as bi-focal lenses and consisting of two lens elements made of glasses of different refractive indices, one of said lenses being embedded in the other so that one of them is exposed on one side only whilst the other is exposed on both sides.

In lenses of this kind the two lens elements have a common surface which is embedded in the glass but which must have the form of a predetermined surface of rotation so as to give to each lens the proper form upon which its optical properties depend according to well known principles.

Now it is the object of the present invention to form this internal surface of separation constituting the common surface of the two lens elements by pressing two flat smooth sheets of glass between dies, the two glass sheets being initially united together and then softened by heat for the pressing operation and the dies being so shaped as to impart to the surface of separation between the glasses the requisite form to constitute the common surface of the two lens elements.

With this object in view the invention consists in the method hereinafter described with reference to the accompanying drawings and comprising the steps hereinafter stated and defined in the appended claims.

In the accompanying drawings—

Fig. 1 is a cross section showing the two glass sheets united together as the first step in the method.

Fig. 2 shows the composite glass sheet of Fig. 1 pressed between the dies so as to impart the requisite form to the surface of separation between the glasses and, Fig. 3 shows in section the completed bi-focal lens, the dotted lines indicating the portions of the product shown in Fig. 2 which are ground away to complete the formation of the lens.

In carrying the invention into effect a piece of flint glass $x$ is flashed or melted onto a piece of crown glass $y$ to produce the composite sheet shown in Fig. 1 and having a smooth flat surface of separation between the glasses. The glass is then rendered plastic by heat and placed between a pair of dies C and D, the die C having a part spherical or other desired shape of projection F, which forms a concavity in the glass $x$ and forces the displaced glass into the portion $y$ obtaining the result shown in Fig. 2. A corresponding depression may be provided in the other die D. The resultant glass is now ground to remove all of the part $x$ with the exception of most of that part contained in the displaced portion $x^2$ (see Figs. 2 and 3) the manner in which the glass is brought to the desired configuration being shown in Fig. 3, in which the broken lines represent the glass immediately before grinding it to the lens shown in section in Fig. 3.

The parts X and Y may have different colour values, as well as different refractory indexes.

Although an example of double convex lens only has been illustrated it is to be understood that my invention may be applied to any other form or type of bi-focal lens.

By means of my invention quite a large number of different results may be obtained in a reliable manner, as the forms of the lens element $x$ and $y$ can be varied.

I claim:—

1. A method of making a bi-focal lens which consists in fusing together two flat pieces of glass having different refractive indices to form a two layer sheet having a smooth common surface, in distorting said common surface by softening the two layer sheet by heat and pressing it between dies so shaped as to impart to said common surface the shape of a predetermined surface of rotation, and is subsequently grinding the product on both sides to complete the formation of a bi-focal lens having one lens element embedded in the other.

2. A method of making a bi-focal lens which consists in fusing together two smooth-faced sheets of glass having different refractive indices, in softening the resultant composite sheet by heat and pressing it between a pair of dies one of which has a part spherical projection, and in grinding the pressed sheet on both sides to complete the formation of a bi-focal lens having one lens element embedded in the other.

CYRIL BERTIE USTONSON.